US006798994B1

(12) United States Patent
Tsao et al.

(10) Patent No.: US 6,798,994 B1
(45) Date of Patent: Sep. 28, 2004

(54) OPTICAL COMMUNICATION SYSTEM

(75) Inventors: Shyh-Lin Tsao, Shindian (TW); Hao-Chih Yu, Ilan (TW)

(73) Assignee: National Science Council, Taipei (TW)

( * ) Notice: Subject to any disclaimer, the term of this patent is extended or adjusted under 35 U.S.C. 154(b) by 525 days.

(21) Appl. No.: 09/651,613

(22) Filed: Aug. 30, 2000

(30) Foreign Application Priority Data

Aug. 30, 1999 (TW) .......................................... 88114869 A

(51) Int. Cl.$^7$ ...................... H04B 10/00; H04B 10/04; H04B 10/06
(52) U.S. Cl. ...................... 398/204; 398/140; 398/195; 398/209; 398/213; 398/162
(58) Field of Search ................................. 398/204, 209, 398/213, 195, 140, 162

(56) References Cited

U.S. PATENT DOCUMENTS

| | | | |
|---|---|---|---|
| 4,918,747 A | | 4/1990 | Bekooij |
| 5,010,588 A | | 4/1991 | Gimlett |
| 5,181,138 A | | 1/1993 | Davis et al. |
| 5,422,752 A | * | 6/1995 | Hardcastle .................. 398/187 |
| 5,457,561 A | | 10/1995 | Taneya et al. |
| 5,457,563 A | | 10/1995 | Van Deventer |
| 5,463,461 A | | 10/1995 | Horiuchi et al. |

OTHER PUBLICATIONS

S. Arnon and N. S. Kopeika; *Adaptive optical transmitter and receiver for space communication through thin clouds;* Applied Optics; Mar. 20, 1997; pp. 1987–1993; vol. 36, No. 9; Optical Society of America; USA.

S. Arnon, S. Rotman, N. S. Kopeika; *Optimum Transmitter Optics Aperture for Satellite Optical Communication;* IEEE Transactions on Aerospace and Electronic Systems; Apr. 1998; pp. 590–596; vol. 34, No. 2; IEEE, T–AES/34/2/03202.

* cited by examiner

*Primary Examiner*—M. R. Sedighian

(57) ABSTRACT

An optical communication system suitable for a coherent optical satellite communication is configured to include an optical transmission device having a laser signal generator, a first reference laser signal generator having a first local oscillating laser signal generator and an automatic frequency controller, an optical receiving device, and a second reference optical signal generator having a second local oscillating laser signal generator. The first reference local oscillating laser signal generator and the automatic frequency controller are used to generate a fixed beat reference optical signal, and thus the optical receiving device is capable of locking the transmitted laser signal according to the fixed beat reference laser signal in a way of heterodyne receiving so as to demodulate the transmitted signal frequency accurately and resolve the problem of laser frequency drifting.

12 Claims, 9 Drawing Sheets

OPTICAL COMMUNICATION SYSTEM

FIELD OF THE INVENTION

The present invention relates to an optical communication system, and more particularly to an optical communication system feasible for the satellite communication architecture today.

DESCRIPTION OF THE RELATED ART

Nowadays, microwave is the popular carrier wave for signal transmission used in the current satellite communication system. Taking an example of the Ka band, the message bandwidth of the Ka band applied in practical system is limited up to 155 Mbit/s. In addition, there will be a great deal of power consumed in the microwave transmission. Therefore, the signal has to be transmitted in packets as transmitting a large quantity of digital data. Accordingly, conventional microwave satellite signal transmission will cost considerable time and a large expenditure. With the rapid increase of the transmitted data quantity, the microwave communication gradually can not meet with the high-capacity data transmission requirements in the future. In particular, the bandwidth of optical fiber communication backbone on the ground has reached 40 Gbit/s, which is far larger than the bandwidth of microwave communication. Thus, if the coming satellite communication is intended to be combined with the ground optical fiber communication system for the purpose of constructing the global high speed communication backbone network, it is in an urgent need to enlarge the data transmission quantity. It would be apparent that using laser light as the carrier signal in a satellite communication system will become an inevitable trend for carrying large quantity data.

With relation to the optical communication techniques of the prior art, S. Arnon and N. S. Kopeika presented a design about an adaptive optical transmitter and receiver for space communication through thin clouds in order to overcome the interference caused by the cloud, in "Applied Optics", Volume 36, No. 9, 1997, p. 1987–1993. Such a design requires that the information about cloud's variation must be acquired in advance so as to adjust the optical transmitter and receiver. Unfortunately, the acquisition of the information about cloud would be a very tough task. Moreover, the design is focused on the effect of weather, but other factors such as transmitter, satellite, receiver and so on are not taken into consideration.

S. Arnon, S. Rotman and N. S. Kopeika proposed a method for minimizing the bit error rate resulting from the satellite vibration, in "IEEE Transaction on Aerospace and Electronic Systems", Volume 34, No. 2, 1998, p. 590–596. The method calculates the bit error rate of the demodulated signal in a calculating unit for adjusting the system parameter and minimizing the bit error rate. However, this proposal did not explore the weather issues and frequency drifting effect, and hence it is not applicable to the practical communications emerging between satellite and the earth.

In 1995, Van Deventer proposes a new scheme of optical mixing device having one photodetector for a heterodyne receiver in order to eliminate the optical polarization phenomenon, in U.S. Pat. No. 5,457,563. This scheme attaches two additional optical mixers to the transmitting end and separates the signal into two packets for transmitting these two packets through two different transmission paths. Subsequently, a photodetector and a heterodyne receiver are attached to the receiving end in order to demodulate the signal. Because these two packets are emitted from the same signal source, the optical polarization phenomenon can be eliminated by means of the signal time delay resulting from applying two different transmission paths. Consequently, this scheme is effective on condition the laser is in stable state.

Horiuchi et al. disclose a coherent optical receiver having optically amplified local oscillator signal, in U.S. Pat. No. 5,463,461. The coherent optical receiver is characterized in that an optical amplifier is employed to amplify a local oscillating laser's power and a heterodyne receiver consisting of a combination of an optical coupler and a photodetector is used to amplify the received weak signal. Hereinafter, an electrical signal amplifier stage is attached to the output end of the photodetector. The advantage of this invention is that the advantage of using a high-power laser can be obtained without boosting laser's emitting power. Nevertheless, this invention does not deal with the drawback of laser's unstable frequency, and thus it will be uneasy to demodulate the modulated signal accurately.

Taneya et al. disclose a system for emitting a beam in the air, in U.S. Pat. No. 5,457,561. The system utilizes a transmitting device to mix the local oscillating laser signal with the emitted signal and then the mixed signal is propagated to a frequency discriminating circuit to generate a differential frequency. Thereafter, a control circuit and a wavelength variable laser element are employed to modulate the emitted signal. Because the local oscillating laser at the receiving end is the same as the laser element for modulating the emitted signal, the modulated signal can be accurately demodulated. Because the system utilizes laser's wavelength to modulate the signal, it will not be usable on the condition of the laser's frequency drifting. Besides, the system is designed for the purpose of short-distance communication, it is also not suitable for satellite communication.

However, the oscillator laser light frequency drifting is very sensitive to the temperature variation. Besides, while the signal is propagating from the transmitting end to the receiving end, it will encounter lots of impacts from the atmosphere, and thus the optical receiver of a conventional coherent optical communication system is not easy to lock the received signal during the demodulation process. That would seriously affect the demodulation ability.

It is therefore tried by the applicant to deal with the above situations encountered by the prior art.

SUMMARY OF THE INVENTION

It is an object of the present invention to develop an optical communication system for minimizing the bit error rate.

It is another object of the present invention to develop an optical communication system for improving the data transmission quantity.

It is another further object of the present invention to develop an optical communication system for resolving the problem of laser frequency drifting.

It is still an object of the present invention to develop a method for communication with an optical signal.

In accordance with a first aspect of the present invention, the optical communication system includes an optical transmitting device for emitting an optical signal carrying an input data as a carrier signal, a first reference optical signal generator for emitting a first reference optical signal, wherein the first reference optical signal has a first beat frequency difference with the frequency of the carrier signal, an optical receiving device receiving the carrier signal and the first reference optical signal through an optical transmission path for retrieving the input data, and a second reference optical signal generator for emitting a second reference optical signal to the optical receiving device, wherein the frequency of the second reference optical signal can be adjusted according to the first beat frequency difference and a second frequency difference which is a frequency difference between the second reference optical signal frequency generated in the second reference optical signal generator and the carrier signal.

At the transmitting end of the optical communication system according to the present invention, the aforesaid optical transmitting device includes an electrical signal modulating device for modulating the input data to an electrical signal, a laser signal generator electrically connected with the electrical signal modulating device for transforming the electrical signal into a laser signal, and a 2×2 optical coupler optically connected with the electrical signal modulating device and the laser signal generator for receiving the laser signal and respectively transmitting the laser signal through a third optical path and a fourth optical path. Moreover, the first reference optical signal generator includes an automatic frequency controller (AFC) optically connected with the 2×2 optical coupler through the fourth optical path for generating a voltage signal according to the frequency drift of the laser signal, wherein the voltage signal has an intensity variation following the frequency drift of the laser signal, and a first local oscillating laser signal generator electrically connected with the automatic frequency controller and optically connected with the 2×2 optical coupler through a second optical path for generating a first reference laser signal and transmitting the first reference laser signal to the 2×2 optical coupler through the second optical path, wherein the first reference laser signal frequency is varied with the intensity of the voltage signal generated by the automatic frequency controller so that the first reference laser signal has the first beat frequency difference with the laser signal.

At the receiving end of the optical communication system according to the present invention, the aforementioned optical receiving device includes a 2×1 optical coupler optically connected with the optical transmission path and the second reference optical signal generator for receiving the carrier signal and the first reference optical signal through the optical transmission path, and receiving the second reference optical signal through a fifth optical path, a photodetector optically connected with the 2×1 optical coupler through a seventh optical path for transforming the carrier signal and the first reference optical signal into an electrical signal, and an electrical signal demodulating device electrically connected with the photodetector for retrieving the input data and a third electrical signal having a third frequency difference for output. Furthermore, the second reference optical signal generator includes a filtering device electrically connected with the photodetector for retrieving a first electrical signal having a first frequency difference, a mixer electrically connected with the filtering device and the electrical signal demodulating device for mixing the first electrical signal and the third electrical signal to generate a reference signal having a frequency of the difference between the first beat frequency difference and the third frequency difference, a frequency discriminating device electrically connected with the mixer for generating a voltage signal having a frequency proportional to the frequency difference between said first beat frequency difference and said third frequency difference according to the difference between the first frequency difference and the third frequency difference, and a second local oscillating laser signal generator electrically connected with the frequency discriminating device and optically connected with the 2×1 optical coupler through a sixth optical path for generating a second reference laser signal and transmitting the second reference laser signal to the 2×1 optical coupler through the sixth optical path, wherein the second reference laser signal frequency can be adjusted according to the frequency drift of the carrier signal.

Remarkably, the optical transmission path is constructed with optical fiber, wherein the optical transmission path further includes a first telescope optically connected with the 2×2 optical coupler through the third optical path for emitting the carrier signal and the first reference optical signal, a reflective mirror mounted on a satellite for reflecting the carrier signal and the first reference optical signal, and a second telescope optically connected with the 2×1 optical coupler through the fifth optical path for receiving the carrier signal and the first reference optical signal reflected from the reflective mirror.

Taking as an example, the electrical signal modulating device and the electrical signal demodulating device performs the modulation/demodulation operation by using frequency-shift keying (FSK) modulation/demodulation method.

The optical communication system further includes an optical polarization controller optically connected between the first local oscillating laser signal generator and the 2×2 optical coupler through the second optical path, and an optical polarization controller optically connected between the second local oscillating laser signal generator and the 2×1 optical coupler through the sixth optical path.

In accordance with a second aspect of the present invention, a method for communication with an optical signal is provided and includes the steps of: (a) emitting a carrier signal carrying an input data, (b) emitting a first reference optical signal, wherein the first reference optical signal has a first beat frequency difference with the carrier signal, (c) receiving the carrier signal and the first reference optical signal from an optical transmission path, and (d) processing the carrier signal and the first reference optical signal with a second reference optical signal generated by a second reference optical signal generator, wherein the frequency of the second reference optical signal can be adjusted according to the first beat frequency difference and a second frequency difference between the carrier signal frequency and the second reference optical signal frequency so as to eliminate the frequency drifting effect of the carrier signal frequency.

Remarkably, the optical transmission path is constructed with optical fiber.

Now the foregoing and other features and advantages of the present invention will be more clearly understood through the following descriptions with reference to the accompanying drawings, in which:

DETAILED DESCRIPTION OF THE PREFERRED EMBODIMENT

Figure 1:
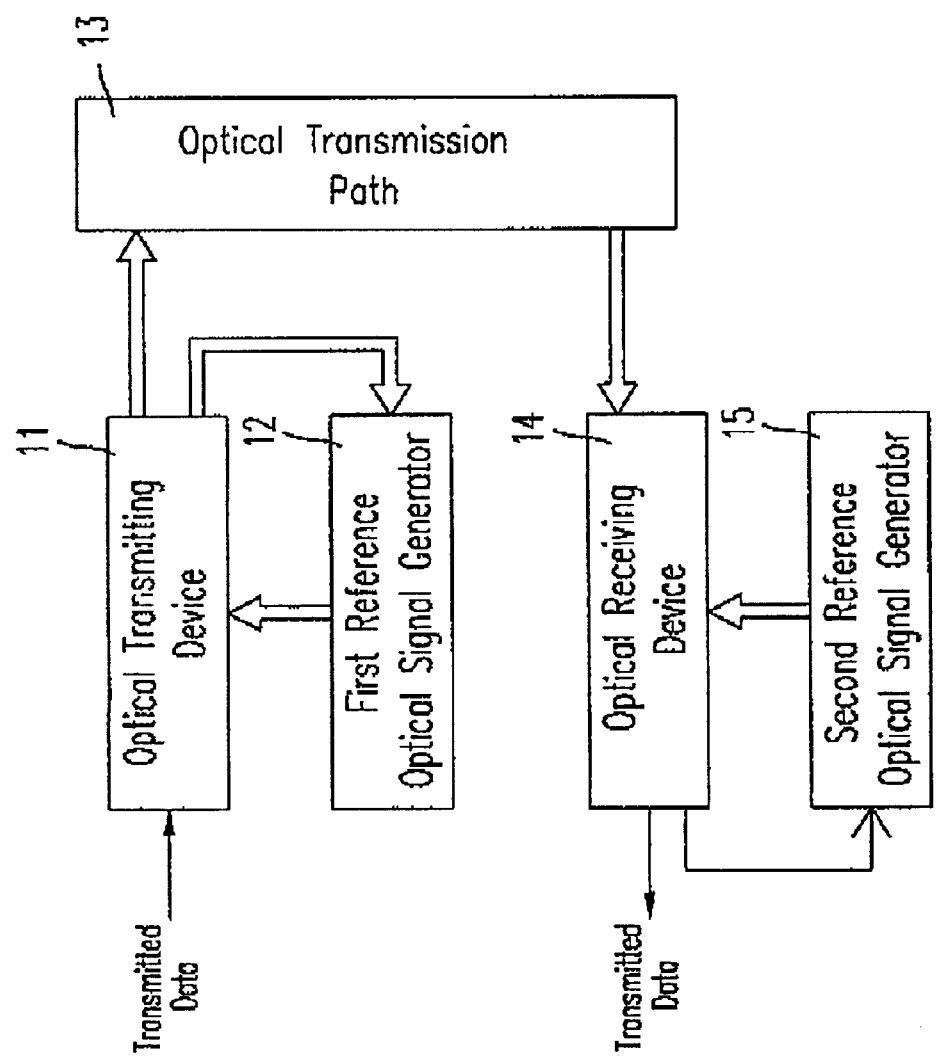
FIG. 1 is a schematic diagram illustrating the optical communication system of the present invention.
Figure 2:
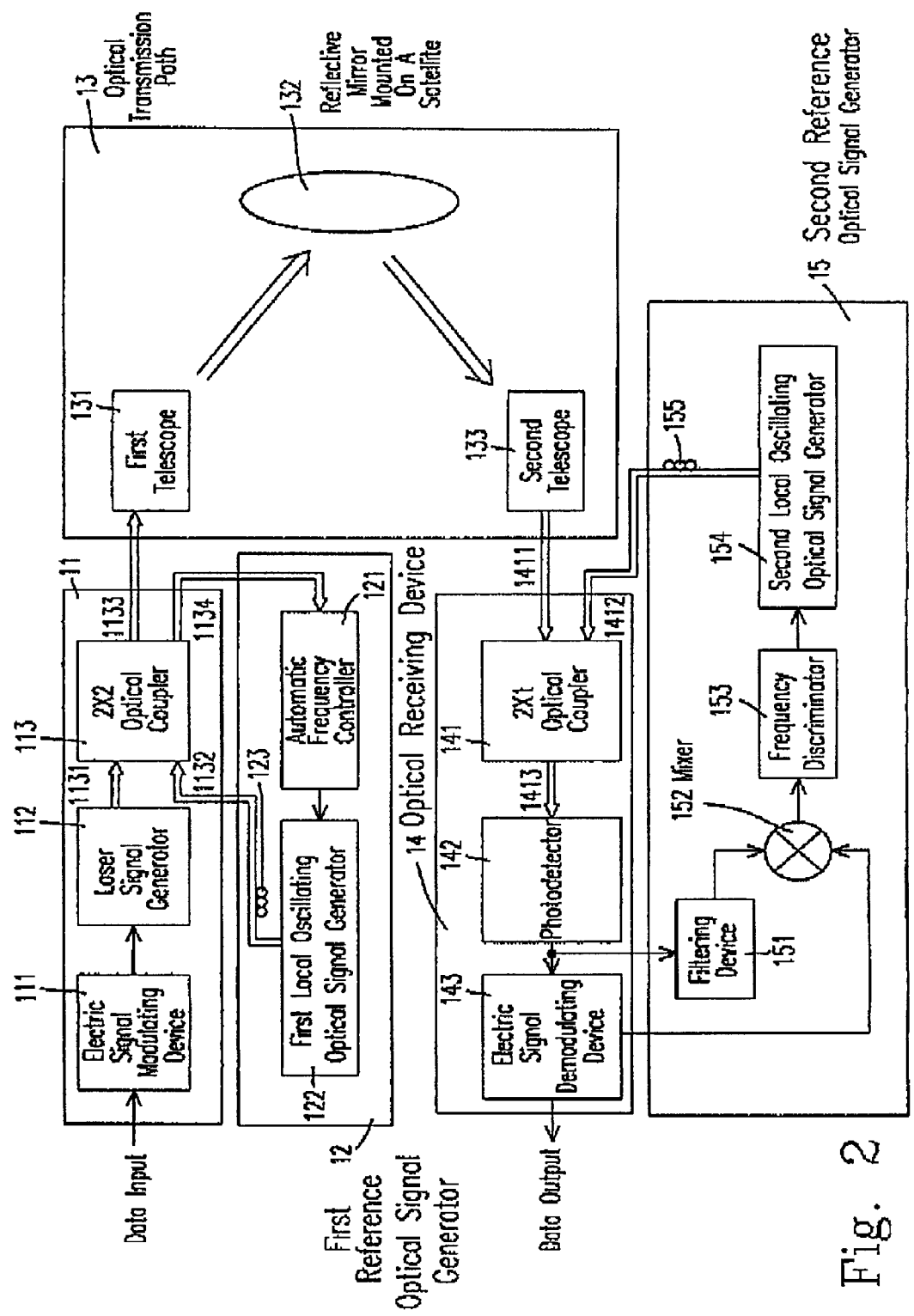
FIG. 2 is a functional block diagram showing the optical communication system according to the present invention.

Referring to FIG. 1 and FIG. 2, the optical communication system of the present invention is composed of an optical transmitting device 11, a first reference optical signal generator 12, an optical receiving device 14, and a second reference optical signal generator 15. The optical signal is transmitted from the optical transmitting device 11 to the satellite and is reflected from the satellite to the optical receiving device 14 through the optical transmission path 13. In this exemplary embodiment, the laser signal is taken as the carrier signal for transmitting the input data. The optical transmitting device 11 outputs a modulated laser carrier signal and a first reference optical signal. In order to eliminate the frequency drifting effect which is commonly occurred in conventional coherent optical communication systems, a first reference optical signal generator 12 including an automatic frequency controller 121 and a first local oscillator laser signal generator 122 is designed in order to generate a first beat frequency difference $f_1$ at the receiving end. The optical receiving device 14 will start to track the transmitted laser signal frequency after receiving the transmitted laser signal. In the mean time, the second reference optical signal generator 15 can be adjusted according to the first beat frequency difference $f_1$ and a second frequency difference $f_3$ which is a frequency difference between the second reference optical signal light frequency generated in the second reference optical signal generator 15 and the transmitted signal light carrier frequency. If the difference between $f_1$ and $f_3$ is equal to the frequency difference between the first reference optical signal and the second reference optical signal, the frequency drifting effect can be eliminated with using the automatic frequency controller 121.

FIG. 2 is a functional block diagram showing a preferred embodiment of the optical communication system according to the present invention. As can be seen from FIG. 2, the optical transmitting device 11 includes an electrical signal modulating device 111, a laser signal generator 112 and a 2×2 optical coupler 113. The electrical signal modulating device 111 is used to modulate the input data into an electrical signal and then the electrical signal is fed into the laser signal generator 112. The laser signal generator 112 will transform the electrical signal into a laser signal as the carrier signal and then the carrier signal is fed into the 2×2 optical coupler 113 through a first optical path 1131. Hereinafter, the laser signal is respectively transmitted through a third optical path 1133 and a fourth optical path 1134. The reference optical signal generator 12 is composed of an automatic frequency controller (AFC) 121 and a first local oscillating laser signal generator 122. The AFC 121 will generate a voltage signal according to the frequency drift of the laser signal outputted from the 2×2 optical coupler 113 through the fourth optical path 1134, in which the voltage signal has an intensity variation following the frequency drift of the laser signal. The frequency of the first reference optical signal generated by the first local oscillating laser signal generator 122 can be adjusted following the voltage signal so that the frequency of the first reference optical signal can maintain a fixed first beat frequency difference $f_1$ with respect to the frequency of the laser signal generator. The light of the first reference optical signal generator and the signal laser is launched to the second optical path 1132 of the 2×2 optical coupler 141 through an optical polarization controller 123.

Figure 3:
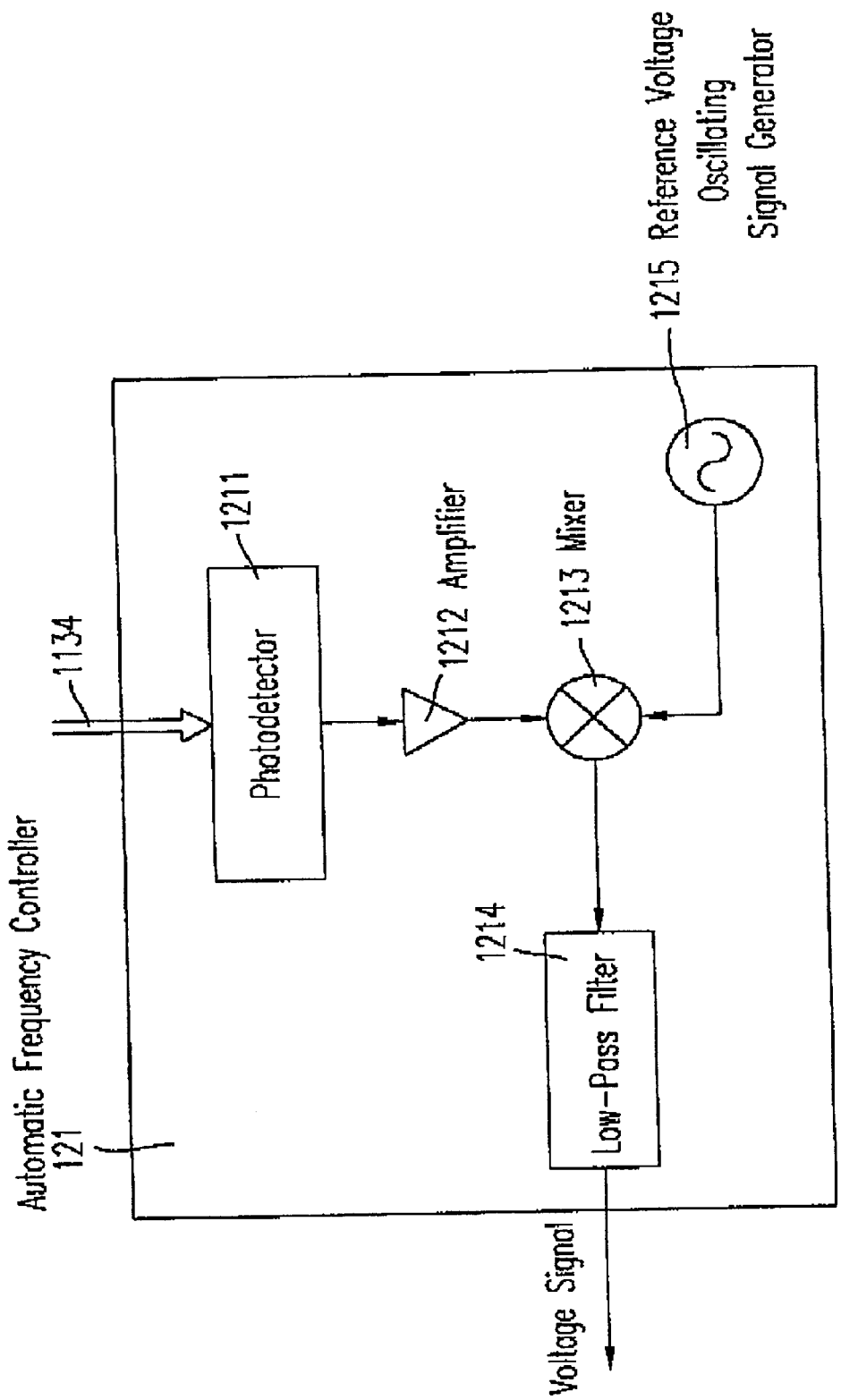
FIG. 3 is a functional block diagram showing the automatic frequency controller (AFC) at the transmitting end according to the present invention.

With an intention of understanding the constitution of the AFC 121, please refer to FIG. 3 showing a functional block diagram of the AFC 121. The AFC 121 is mainly composed of a photodetector 1211, an amplifier 1212, a mixer 1213, a low-pass filter 1212, and a reference voltage oscillating signal generator 1215. The AFC 121 is used to generate a voltage signal having the intensity being adjusted according to the frequency drift. Since the operating principle of the AFC circuit according to the present invention is analogous to the ordinary AFC circuit, we are not intended to have a further discussion herein.

Referring to FIG. 2 again, the laser signal consisting of the first reference optical signal and the carrier signal are propagated to a first telescope 131 at the transmitting end through the third optical path 1133 of the 2×2 optical coupler 113 for emission to the aerospace. The emitted laser signal will penetrate the atmosphere and be incident on the reflective mirror 132 mounted on a satellite. The reflected laser signal will be reflected back to the second telescope 133 at the receiving end for being received by the optical receiving device 14. The optical receiving device 14 is composed of a 2×1 optical coupler 141, a photodetector 142 and an electrical signal modulating device 143. The 2×1 optical coupler 141 is used to receive the laser signal consisting of the first reference optical signal and carrier signal through a fifth optical path 1411, and the photodetector 142 will receive laser signal consisting of the first reference optical signal and carrier signal through a seventh optical path 1413 and transform the received laser signal into an electrical signal and then feed the electrical signal into the electrical signal demodulating device for performing demodulation, thereby retrieving the transmitted data and a third electrical signal having a frequency difference $f_3$ with the laser signal for output. Besides, the second reference optical signal generator 15 is composed of a filtering device 151, a mixer 152, a frequency discriminator 153 and a second local oscillator laser signal generator 154. The filtering device 151 is used to filter the electrical signal output from the photodetector 142 so as to retrieve a first electrical signal having a fixed first frequency difference $f_1$ with the laser signal. The mixer 152 is used to mix the first electrical signal and the third electrical signal to generate a second reference optical signal having a frequency difference of $|f_1-f_3|$ with the emitted laser signal and output the mixed signal to the frequency discriminator 153 (when $f_1$ is set to be equal to $f_3$, the frequency discriminator 153 can be substituted by a low-pass filter). The frequency discriminator 153 will generate a voltage signal having an intensity proportional to the magnitude of $|f_1-f_3|$ according to the variation of $|f_1-f_3|$ and output the voltage signal to the second local oscillating laser signal generator 154. The second local oscillating laser signal generator 154 will generate a second reference laser signal being coupled to a sixth optical path 1412 of the 2×1 optical coupler 141 through an optical polarization controller 155. Because the frequency of the second reference laser signal may vary with the intensity of the voltage signal output from the frequency discriminator 153, the frequency of the second reference laser signal can be adjusted according to the frequency drift of the carrier signal. Therefore, the optical receiving device 14 is able to accurately tracking the emitted light signal, thereby resolving the laser frequency drifting problem and promoting the system performance.

Figure 4:
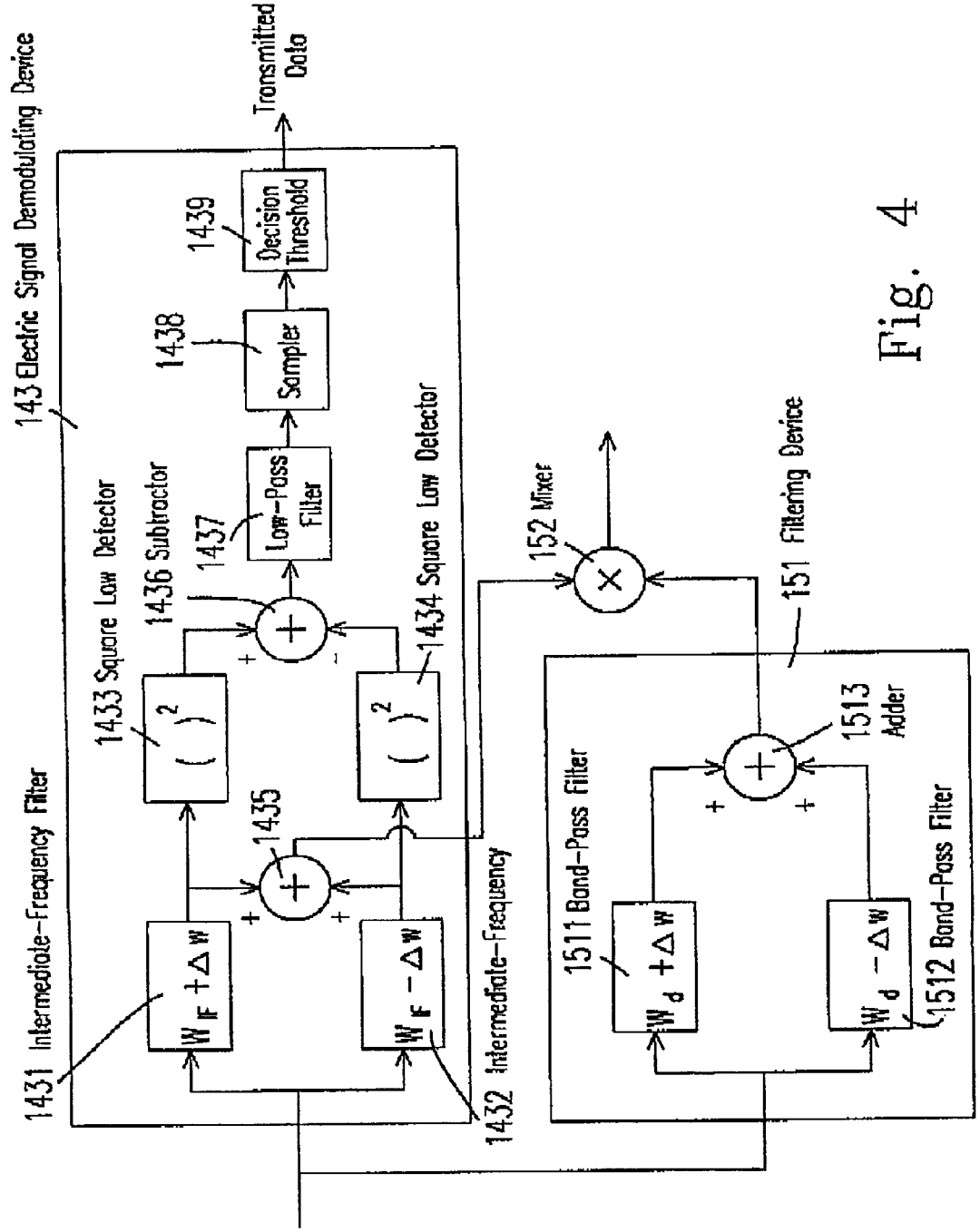
FIG. 4 is a functional block diagram showing the electrical signal demodulating device and the filtering device at the receiving end according to the present invention.

In light of the technique applied in the preferred embodiment of the present invention, the technique of the present invention is applicable to miscellaneous modulation-demodulation methods. For the purpose of obtaining a better understanding to the techniques applied in the present invention, we take the FSK modulation-demodulation method as an example for illustration. Please refer to FIG. 4 showing the block diagram of the electrical signal demodulating device 143 and the filtering device 151. The electrical signal demodulating device 143 includes two intermediate-frequency (IF) filters 1431 and 1432, two square law detectors 1433 and 1434, an adder 1435, a subtractor 1436, a low-pass filter 1437, a sampler 1438 and a decision threshold 1439. The filtering device 151 includes two band-pass filters 1511 and 1512, and an adder 1513. For the purpose of illustration, we will further describe the operating fundamentals of the electrical signal demodulating device 143 and the filtering device 152 in the following in a way of mathematical demonstration.

Figure 5A:
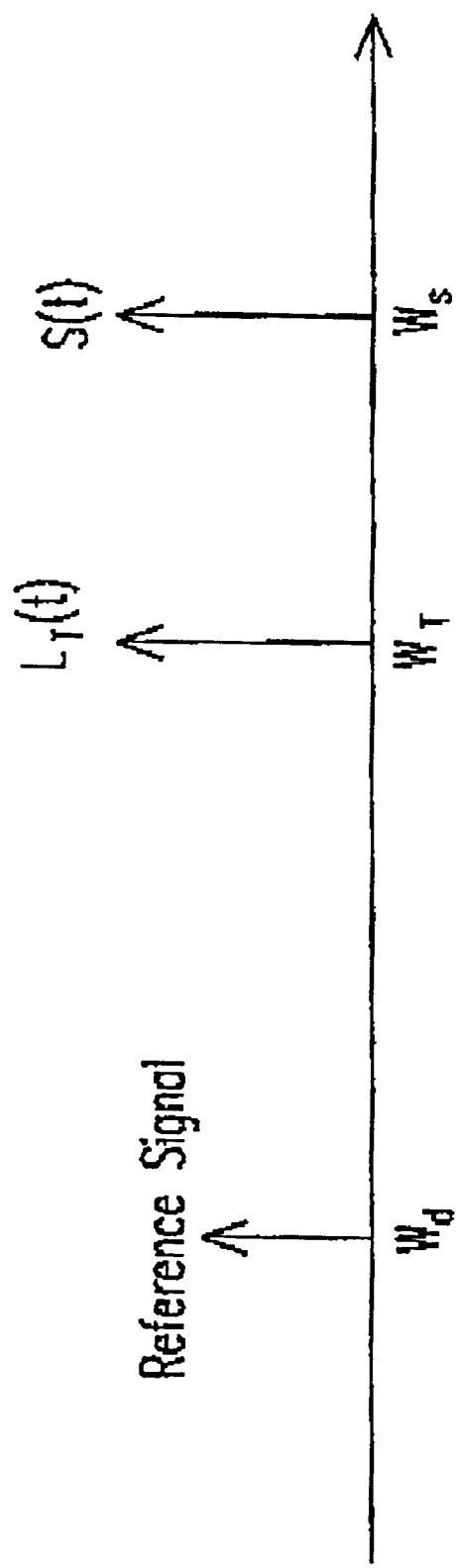
FIGS. 5(a) and 5(b) show the optical frequencies and RF beat frequencies locations at the transmitting end and at the receiving end respectively according to the present invention.

At the transmitting end, the carrier laser signal S(t) and the first reference laser signal $L_T(t)$ are represented respectively by the following equations:

$$S(t)=\sqrt{P_S}\,cos(w_i t+\phi_S(t)) \tag{1}$$

$$w_i = \begin{cases} w_1 = w_s + \Delta w \Rightarrow m(t) = 1 \\ w_2 = w_s - \Delta w \Rightarrow m(t) = 0 \end{cases} \tag{2}$$

$$L_T(t)=\sqrt{P_T}\,cos(w_T t-\phi_T(t)) \tag{3}$$

where $P_S$ and $P_T$ are the powers of the carrier signal and the first reference optical signal respectively, $\phi_S(t)$ and $\phi_T(t)$ are phase noise, $w_S$ is the carrier frequency, $w_T$ is the frequency of the first reference optical signal, m(t) stands for the baseband signal, and Δw is the frequency of the frequency-shift keying (FSK) modulation. The frequency difference $w_d$ ($w_d=2\pi f_1$) between $w_S$ and $w_T$ can be fixed by the automatic frequency controller (AFC) circuit 121 in order to generate a second reference optical signal at the receiving end. The frequency locations at the transmitting end can be clearly understood from FIG. 5(a).

After the laser signal is emitted from the first telescope 131 at the transmitting end, it will undergo dispersion and the absorption and scattering of the particles in the atmosphere. Accordingly, after the signal is reflected by the reflective mirror 132 to reach the second telescope 133 at the receiving end, the power will be attenuated as:

$$P_{unscatter}=P_{source}\,exp(-\tau) \tag{4}$$

$$\tau = \frac{L_C}{L_E} \tag{5}$$

where τ represents the weather attenuation factor, $P_{source}$ and the $P_{unscatter}$ respectively indicate the signal source and the received attenuated signal, and $L_C$ and $L_E$ respectively stand for the average thickness of cloud and the extinction length.

The signal intensity will also be attenuated with the influence of satellite vibration, and the attenuation can be expressed in terms of $\theta_r$:

$$L_{loss}(\theta_r)=exp(-\theta_r^2) \tag{6}$$

where $\theta_r$ is the satellite vibration angle, and the probability distribution of the satellite vibration angle is represented as follows:

$$f(\theta_r) = \frac{\theta_r}{\sigma_{vr}^2}exp\left[-\left(\frac{\theta_r}{\sqrt{2}\sigma_{vr}}\right)^2\right] \tag{7}$$

where $\sigma_{vr}$ is:

$$\sigma_{vr}=[S_f(SNR)^{0.5}]^{-1} \tag{8}$$

The SNR herein is the signal-to-noise ratio (SNR) of the output of the Intermediate-frequency (IF) filter.

To conclude, the received signal at the receiving end can be represented by the following equations:

$$S_{reflect}(t)=\sqrt{P_S R_{loss} L_{loss}(\theta_r)}exp(-\tau)cos(w_i t+\phi_S(t)) \tag{9}$$

$$S_{reflect}(t)=\sqrt{P_S R_{loss} L_{loss}(\theta_r)}exp(-\tau)cos(w_i t+\phi_S(t)) \tag{10}$$

where $R_{loss}$ is the loss factor due to the diverging angle of the laser beam.

$$R_{loss} = \left(\frac{\overline{D_r}}{2\left(\overline{D_t}+\sqrt{2\overline{L_{E-S}}^2(1-2cos(\theta_1))}\right)}\right)^2 \tag{11}$$

where $\overline{D_r}$ is the aperture of the first telescope 131, $\overline{D_t}$ is the aperture of the second telescope 133, $\overline{L_{E-S}}$ is the distance from the first telescope 131 to the satellite, and $\theta_1$ is the diverging angle of the laser beam.

When the reflected laser signal $S_{reflect}(t)$ and $L_{reflect}(t)$ are received by the second telescope 133, the power of the received signal at the receiving end will attenuate due to the aforementioned factors. Accordingly, we can adopt a way of heterodyne receiving at the receiving end to raise the sensitivity of the optical communication system.

Figure 5B:
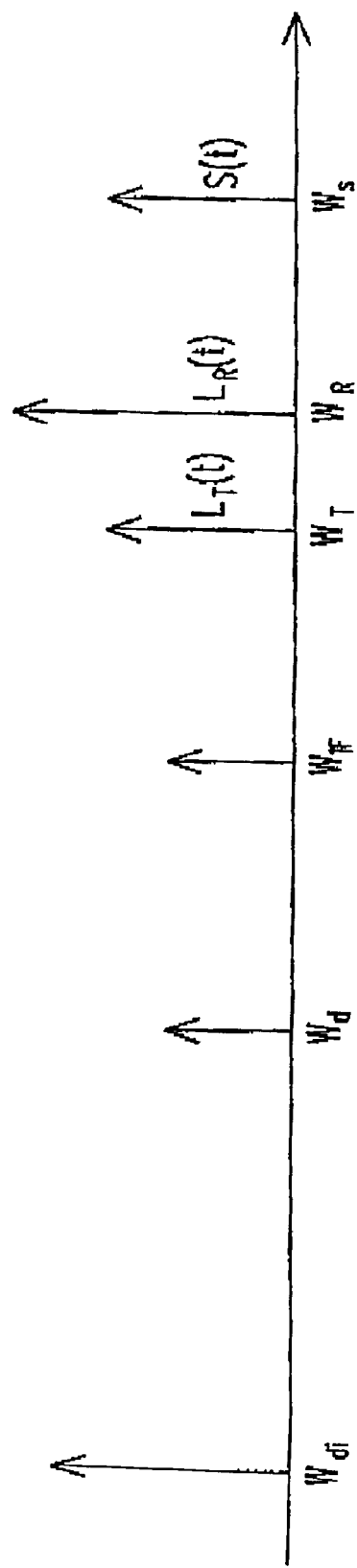

The second reference laser signal generated by the second local oscillating laser signal generator 154 at the receiving end can be represented as follows:

$$L_R(t)=\sqrt{P_R}\,cos(w_R t+\phi_R(t)) \tag{12}$$

where $P_R$ and $w_R$ are respectively the output power and the frequency of the second reference laser signal at the receiving end, $\phi_R(t)$ is the phase noise. The electrical signal I(t)

being transformed by the photodetector 142 can be expressed as:

$$I(t)=R\{½P_SR_{loss}L(\theta_r)(\exp(-\tau))^2+½P_TR_{loss}L(\theta_r)(\exp(-\tau))^2+½P_R+$$
$$2\sqrt{P_SP_T}R_{loss}L(\theta_r)(\exp(-\tau))^2\cos[(w_d\pm\Delta\omega)t+(\phi_S(t)-\phi_T(t))]+$$
$$2\sqrt{P_SP_R R_{loss}L(\theta_r)}\exp(-\tau)\cos[(w_{IF}\pm\Delta\omega)t+(\phi_S(t)-\phi_T(t))]+$$
$$2\sqrt{P_TP_R R_{loss}L(\theta_r)}\exp(-\tau)\cos[w_{LH}t+(\phi_T(t)-\phi_R(t))]\} \quad (13)$$

where $w_d$ ($w_d=2\pi f_1$), $w_{IF}$ ($w_{IF}=2\pi f_3$) and $w_{LH}$ ($w_{LH}=2\pi f_2$) are respectively the frequency differences between S(t) and $L_T(t)$, the frequency difference between S(t) and $L_R(t)$ and the frequency difference between $L_T(t)$ and $L_R(t)$. The frequency locations at the receiving end can be clearly understood from FIG. 5(b). The reference signal at the transmitting end can be derived from Eq. (13), in which:

$$i_{CNR}(t)=2R\sqrt{P_SP_T}R_{loss}L_{loss}(\theta_r)(\exp(-\tau))^2\cos[(w_d\pm\Delta\omega)t+(\phi_S(t)-\phi_T(t))] \quad (14)$$

In order to raise the accuracy of the AFC, the signals are filtered by one set of intermediate-frequency filters 1431 and 1432, and also are filtered by one set of band-pass filters 1511 and 1512. After the two filtered signals are mixed, a microwave reference signal $I_{CNR}(t)$ is generated and be represented by the following equation:

$$i_{CNR}(t)=4R^2P_S(\alpha/T)^2\sqrt{P_RP_T}(R_{loss}L_{loss}(\theta_r))^{1.5}(\exp(-\tau))^3\cos[(w_{di}\pm\Delta w)t+(\phi_S(t)-\phi_T(t))] \quad (15)$$

where $w_{di}$ ($w_{di}=2\pi|f1-f3|$ is the frequency difference between $w_d$ and $w_{IF}$, and R is responsivity of the photodetector. Hence, the carrier-to-noise ratio (CNR) of the received reference signal will be:

$$CNR = \frac{8\left(R^2P_S\sqrt{P_RP_T}(R_{loss}L_{loss}(\theta_r))^{1.5}(\exp(-\tau))^3\right)^2}{\left(2R\sqrt{P_SP_R}R_{loss}L_{loss}(\theta_r)\exp(-\tau)+2R\sqrt{P_SP_T}R_{loss}L_{loss}(\theta_r)(\exp(-\tau))^2\right)^2(\sigma_s^2+\sigma_T^2)} \quad (16)$$

where $\sigma_S$ and $\sigma_T$ respectively indicate the shot noise and thermal noise.

$$\sigma_S^2=2q(I(t)+I_d)\Delta f \quad (17)$$

$$\sigma_T^2=(4kT_{emp}/R_L)A_n\Delta f \quad (18)$$

where q, k, $T_{emp}$ and $R_L$ respectively stand for the electric charge quantity, Boltzmann constant, temperature and Receiver load. $I_d$, $A_n$ and $\Delta f$ respectively stand for dark current, amplifier noise figure and filter bandwidth. Thus, CNR can be represented as:

While the laser signal has been locked, we can filter the modulated signal by the two intermediate-frequency filters 1431 and 1432, and the filtered signal is further processed subsequently through the square law detectors 1433, 1434, adder 1435, subtractor 1436, low-pass filter 1437, signal sampler 1438 and decision threshold 1439 for retrieving the transmitted data. The aforementioned procedure can be expressed by mathematical equation as follows.

Now, the time response of the IF filters 1431, 1432, and the low-pass filter 1437 are respectively defined as follows:

Time response of the IF filter 1431:

$$BPF_1(t) = \begin{cases} \frac{\alpha}{T}\cos[(\omega_{IF}+\Delta\omega)t] & \text{if } t \in \left[0,\frac{T}{\alpha}\right] \\ 0 & \text{if } t \notin \left[0,\frac{T}{\alpha}\right] \end{cases} \quad (20)$$

Time response of the IF filter 1432:

$$BPF_2(t) = \begin{cases} \frac{\alpha}{T}\cos[(\omega_{IF}-\Delta\omega)t] & \text{if } t \in \left[0,\frac{T}{\alpha}\right] \\ 0 & \text{if } t \notin \left[0,\frac{T}{\alpha}\right] \end{cases} \quad (21)$$

Time response of the low-pass filter 1437:

$$H_L(t) = \sum_{i=1}^{\alpha}\delta\left(t-\frac{iT}{\alpha}\right) \quad (22)$$

where T and $\alpha$ are the period of the modulated signal and a positive integer greater than 1, respectively.

The modulated signal is propagated through these three filters and then be sampled and decided, and a bit error rate (BER) formula can be deduced to represent the system performance, in which:

$$CNR = \frac{8\left(R^2P_R\sqrt{P_SP_T}(R_{loss}L_{loss}(\theta_r))^{1.5}(\exp(-\tau))^3\right)^2}{\left(2R\sqrt{P_SP_R}R_{loss}L_{loss}(\theta_r)\exp(-\tau)+2R\sqrt{P_SP_T}R_{loss}L_{loss}(\theta_r)(\exp(-\tau))^2\right)^2(\sigma_s^2+\sigma_T^2)} \quad (19)$$

$$\gamma(\theta_r) = \frac{\sqrt{2\alpha}\left(\frac{1}{2} - \frac{\pi\Delta vT}{6\alpha} - \frac{\alpha(\alpha + \pi\Delta vT - \alpha\cos(2\Delta\omega T/\alpha))}{(2\Delta\omega T)^2}\right)}{\left[\frac{2}{45}\left(\pi\Delta v\frac{T}{\alpha}\right)^2 \varsigma(2\Delta\omega T) + \frac{\alpha^2}{\psi(\theta_r)^2} + \frac{2\alpha}{\psi(\theta_r)}\left(\frac{1}{2} - \frac{\pi\Delta vT}{6\alpha} + \frac{\alpha(\alpha + \pi\Delta vT - \alpha\cos(2\Delta\omega T/\alpha))}{(2\Delta\omega T)^2}\right)\right]^{1/2}} \quad (23)$$

where $\Delta v$ is the sum of the individual phase noise of $S(t)$ and $L_T(t)$, and $$\Delta v = \Delta v_S + \Delta v_L \quad (24)$$

where $\Delta v_S$ and $\Delta v_L$ are the phase noise of $S(t)$ and $L_T(t)$ respectively.

$$\varsigma(2\Delta\omega T) = \begin{cases} 1 - e^{-\beta\rho\Delta\omega T}\left[\cos(q) + \frac{\beta}{\sqrt{1-\beta^2}}\sin(q)\right] & \text{for } \beta \neq 1 \\ 1 - e^{-\beta\rho\Delta\omega T} - \rho 2\Delta\omega T e^{-\rho 2\Delta\omega T} & \text{for } \beta = 1 \end{cases} \quad (25)$$

$$\rho \approx -0.0155 - \frac{0.263}{\alpha^2} + \frac{0.578}{\alpha} \quad (26)$$

$$\beta \approx 0.27 - \frac{1.5}{\alpha^2} + \frac{2.22}{\alpha} \quad (27)$$

$$q = \rho 2\Delta\omega T\sqrt{1-\beta^2} \quad (28)$$

$$\psi(\theta_r) = \frac{4R^2 P_S P_R R_{Total} L_{loss}(\theta_r)\exp(-\tau)^2}{2\sigma(\theta_r)^2} \quad (29)$$

In order to minimize the bit error rate, the system can be designed to satisfy the criterion of $\Delta vT/\alpha \square 1 \square 2\Delta\omega T/\alpha$. Introducing the above criterion into Eq. (23) and we can obtain the BER of the optical communication system according to the present invention as:

$$BER(\theta_r) \equiv Q(\gamma(\theta_r)) = \frac{1}{\sqrt{2\pi}} \int_{\eta\gamma(\theta_r)}^{\infty} e^{-x^2/2} dx \quad (30)$$

$$BER = \int_0^{\infty} BER(\theta_r) f(\theta_r) d\theta_r \quad (31)$$

where $\eta$ is an empirical factor, and its magnitude should be around 1.36.

In this illustrative embodiment, the carrier signal and the reference signal are amplified by applying a way of heterodyne receiving, and a new reference signal is generated by filtering these two signals and then mixing the two filtered signals by a mixer. Thereafter, the new reference signal is applied to lock the modulated signal. Because the original reference signal has been stabilized at the transmitting end, there is no need to add an additional reference signal source at the receiving end. Thus the system architecture will not only be simplified, but the noise resulting from the reference signal can be avoided effectively.

Figure 6:
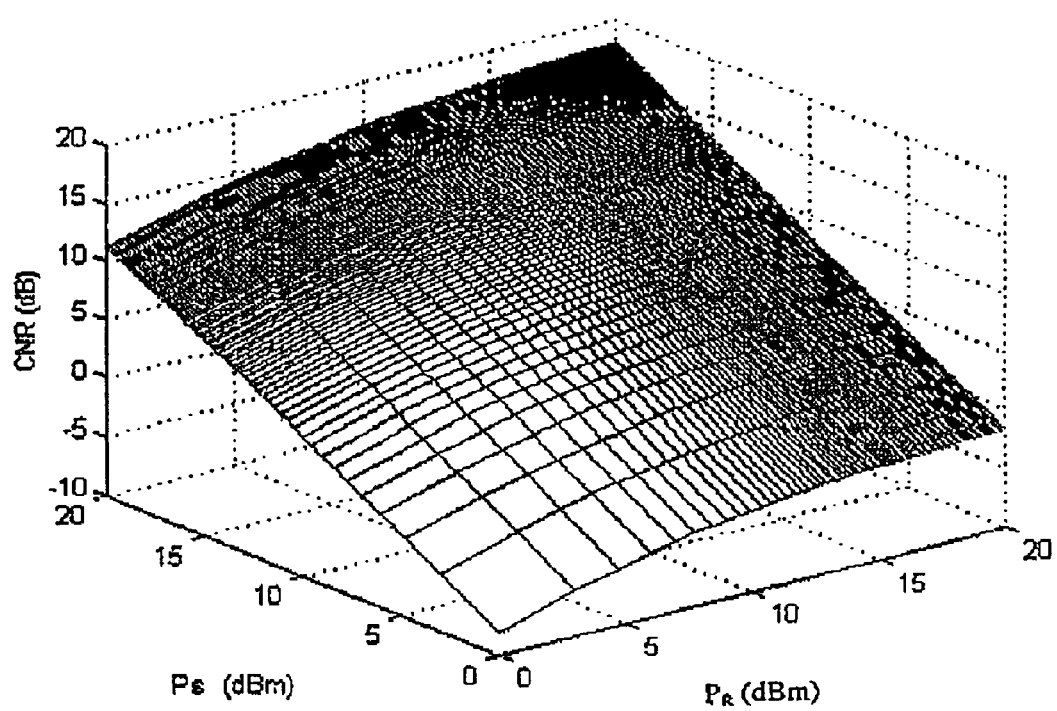
FIG. 6 illustrates the relationship among the carrier-to-noise ratio (CNR) of the reference signal, the FSK modulated signal power, and the local oscillating laser signal power at the receiving end according to the present invention.

For the purpose of verifying the practicality of the optical communication system according to the present invention, we specifically analyze the BER of the system and the CNR of the first reference laser signal. We make a simulation of the foregoing embodiment in which the data rate is 2.5 Gbps, and assume that the optical communication system can satisfy the communication specifications. FIG. 6 illustrates the relationship among the carrier-to-noise ratio (CNR) of the reference signal, the FSK modulated signal power, and the local oscillating laser signal power at the receiving end according to the present invention, and other parameters are defined in Table. 1.

TABLE 1

| Parameter | Symbol | Value |
|---|---|---|
| Distance between satellite and the earth | z | 35000 km |
| Photodetector responsivity | R | 0.7 |
| Boltzmann constant | k | $1.38 \times 10^{-23}$ |
| Temperature | $T_{emp}$ | 300K |
| Receiver load | $R_L$ | 50 Ω |
| Amplifier noise | $A_n$ | 1 dB |
| Dark current | $I_d$ | $10^{-6}$ A |
| Data rate | $\Delta f$ | 2.5 Gbps |
| Diverging angle | $\theta_r$ | $0.55 \times 10^{-6\circ}$ |
| Weather attenuation factor | τ | 4 |
| Vibration derivation | $\sigma_{vr}$ | 0.0001 |
| Parameter of the IF filter | α | 4 |
| Aperture of the first telescope | $D_t$ | 1 cm |
| Aperture of the second telescope | $D_r$ | 1 m |
| Phase noise of laser signal | $\Delta_v$ | 0 |
| First reference laser signal's power | $P_T$ | 100 mW |

Figure 7:
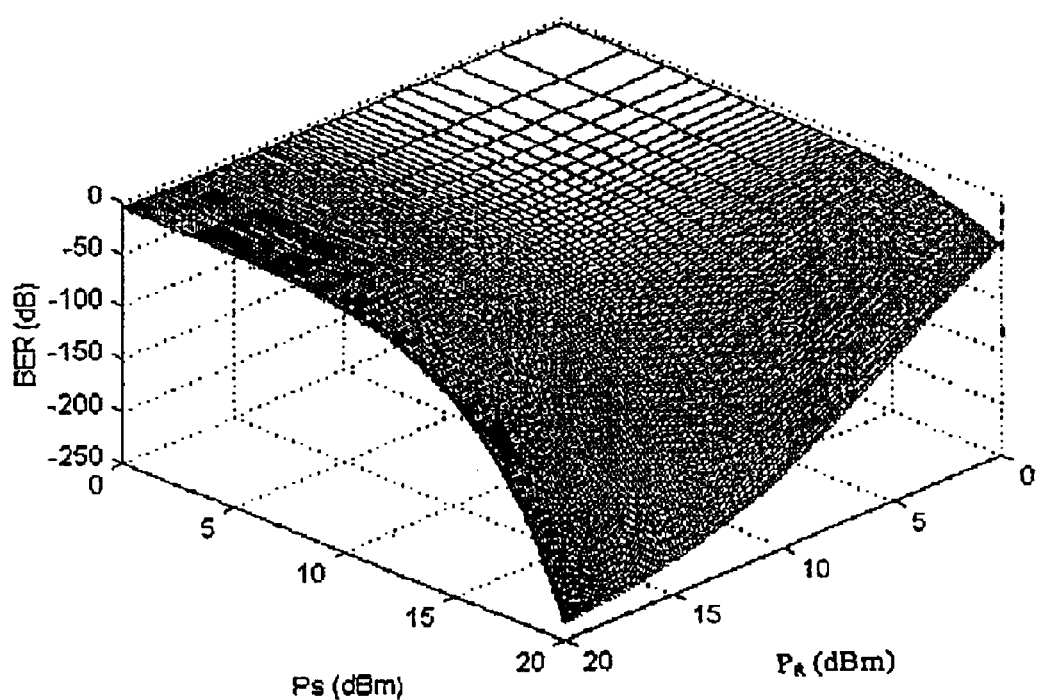
FIG. 7 illustrates the relationship among the bit error rate (BER), the FSK modulated signal power, and the local oscillating laser signal power on condition the phase noise of the laser signal is not taken into consideration according to the present invention.

It can be clearly found that the CNR of the reference signal will increase with the increasing of Powers $P_S$ and $P_R$. According to FIG. 6, when $P_S$ is 20 dBm, $P_R$ can be in the range of 6 to 20 dBm, and the CNR of the reference signal can be maintained above 15 dB. It is obviously from the analysis of FIG. 6 that the beat difference signal can be effectively transmitted in such a system. FIG. 7 illustrates the relationship among the bit error rate (BER), the FSK modulated signal power, and the local oscillating laser signal power on condition the phase noise of the laser signal is not taken into consideration according to the present invention, and other parameters are defined in Table. 2.

TABLE 2

| Parameter | Symbol | Value |
|---|---|---|
| Distance between satellite and the earth | z | 35000 km |
| Photodetector responsivity | R | 0.7 |
| Boltzmann constant | k | $1.38 \times 10^{-23}$ |
| Temperature | $T_{emp}$ | 300K |
| Receiver load | $R_L$ | 50 Ω |
| Amplifier noise | $A_n$ | 1 dB |
| Dark current | $I_d$ | $10^{-6}$ A |
| Data rate | $\Delta f$ | 2.5 Gbps |
| Diverging angle | $\theta_r$ | $0.55 \times 10^{-6\circ}$ |
| Weather attenuation factor | τ | 8 |
| Vibration derivation | $\sigma_{vr}$ | 0.1 |
| Parameter of the IF filter | α | 8 |
| Frequency deviation | $\Delta w$ | 5 GHz |
| Aperture of the first telescope | $D_t$ | 1 cm |
| Aperture of the second telescope | $D_r$ | 1 m |
| Phase noise of laser signal | $\Delta_v$ | 0 |
| First reference laser signal's power | $P_T$ | 100 mW |

Figure 8:
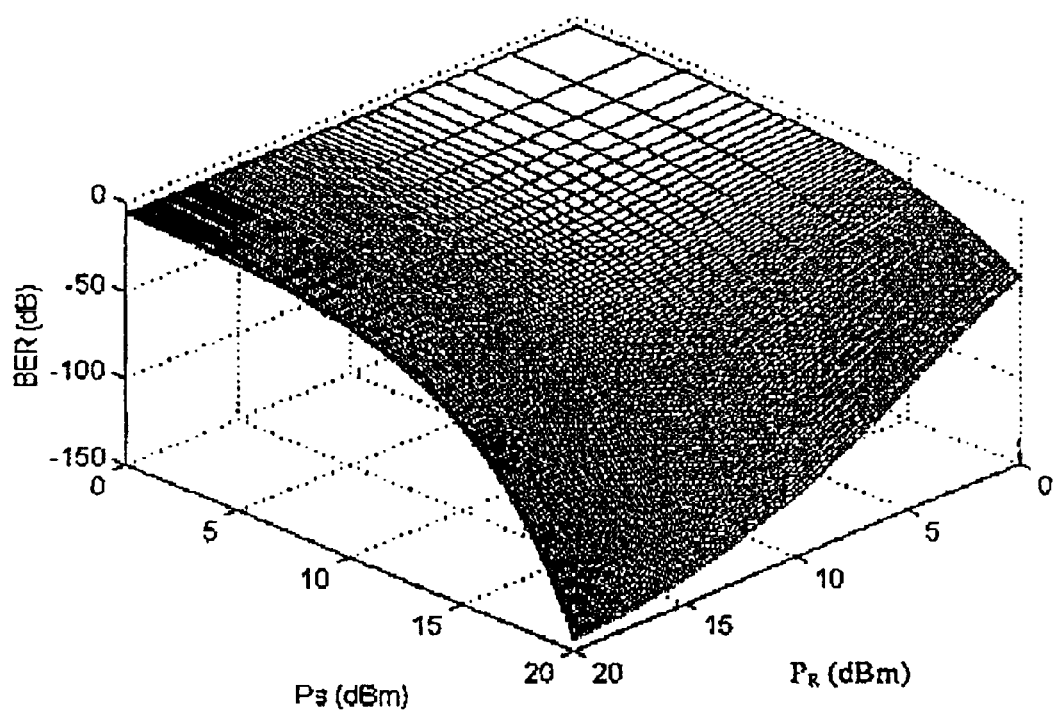
FIG. 8 illustrates the relationship among the bit error rate (BER), the FSK modulated signal power, and the local oscillating laser signal power on condition the phase noise of the laser signal is taken into consideration according to the present invention.

It can be found from FIG. 7 that the BER of the system will be lowered with the increasing of powers $P_S$ and $P_R$. According to our survey, when $P_S$ reaches above 17 dBm and the power $P_R$ is ranged between 17 dBm and 20 dBm, the BER of the system can be lower than $10^{-9}$. It proves that the signal can be efficiently transmitted in the system by using appropriate parameters. FIG. 8 illustrates the relationship among the bit error rate (BER), the FSK modulated signal power, and the local oscillating laser signal power on condition the phase noise of the laser signal is taken into consideration according to the present invention, and other parameters are defined in Table. 3.

TABLE 3

| Parameter | Symbol | Value |
| --- | --- | --- |
| Distance between satellite and the earth | z | 35000 km |
| Photodetector responsivity | R | 0.7 |
| Boltzmann constant | k | $1.38 \times 10^{-23}$ |
| Temperature | $T_{emp}$ | 300K |
| Receiver load | $R_L$ | 50 Ω |
| Amplifier noise | $A_n$ | 1 dB |
| Dark current | $I_d$ | $10^{-6}$ A |
| Data rate | Δf | 2.5 Gbps |
| Diverging angle | $θ_r$ | $10^{-6°}$ |
| Weather attenuation factor | τ | 8 |
| Vibration derivation | $σ_{vr}$ | 0.0001 |
| Parameter of the IF filter | α | 1 |
| Frequency deviation | Δw | 2.5 GHz |
| Aperture of the first telescope | $D_t$ | 1 cm |
| Aperture of the second telescope | $D_r$ | 1 m |
| Phase noise of laser signal | $Δ_v$ | 10 MHz |
| First reference laser signal's power | $P_T$ | 100 mW |

It can be found from FIG. 8 that the BER of the system will be lowered with the increasing of powers $P_S$ and $P_R$. According to our survey, when $P_S$ reaches above 20 dBm and the power $P_R$ is ranged between 17 dBm and 20 dBm, the BER of the system can be lower than $10^{-9}$. Moreover, when $P_S$=20 dBm and $P_R$=20 dBm, the phase noise of the laser signal will be below 3 GHz and the data rate can still be maintained at 2.5 Gbps. From the analysis result of FIG. 6, we can obtain a variety of average statistics concerning the type of clouds in connection with attenuation factors as shown in Table. 4.

TABLE 4

| Type of Cloud | Average altitude (x1000 ft) | Layer length (m) | Extinction thickness (ext. lengths) | Average |
| --- | --- | --- | --- | --- |
| Cumulonimbus | 2.5–18 | middle | 25 | 120 |
| Nimbostratus | 6.5–10 | middle | 55 | 51 |
| Altocumulus | 15–20 | middle | 65 | 18 |
| Altostratus | 14–22 | middle | 45 | 30 |
| Stratocumulus | 2.5–3.0 | low | 20 | 27 |
| Stratus | 2–5 | low | 15 | 62 |
| Cumulus | 2–5 | low | 50 | 10 |
| Cirrostratus | 30–35 | high | 350 | 5 |
| Cirrocumulus | 22–26 | high | 350 | 5 |
| Cirrus | 20–30 | high | 350 | 3 |

While the weather attenuation factor τ is ranged between 1 and 4, that is, while the weather situation is the combination of cumulonimbus at 2500–18000 ft. and cirrocumulus at 22000–26000 ft., and the data rate is 2.5 Gbps and the standard deviation of the satellite vibration angel is 0.0001, the CNR of the microwave reference signal can reach above 15 dB. Hence, the system of the present invention can accurately retrieve the beat reference signal under the influence of these attenuation factors. In addition to the foregoing advantages, the quality of the demodulated signal is quite good after the modulated signal is locked. Also, it can be known from FIG. 7 and FIG. 8 that the system of the present invention can not only transmit signals under harsh weather but the data transmission quantity is much larger than that of the conventional microwave communication. It is obvious from FIG. 8 that if the phase noise of laser signal exists, the transmission quality will be affected. However, if we can make a modification to the IF filter, the system transmission performance still can be improved. As shown in FIG. 8, the phase noise of laser signal is 10 MHz, and if we modify the parameter of the IF filters to be 3 (which denotes the filter bandwidth is the most idealistic), the BER of the system can reach $10^{-9}$.

In summary, the characteristics of the present invention are that the reference signal can be propagated to the receiver located at the remote side by heterodyne receiving, and the unstable frequency can be avoided. Consequently, the quality of satellite communication is significantly improved. Even if the phase noise of laser signal is generated, the system of the present invention still can possess a better quality. Therefore, the system of the present invention can provide an obviously high signal frequency tracking ability. On the other hand, the optical transmitting device and optical receiving device of the present invention are easy to manufacture and the manufacturing cost are lower than conventional microwave transmitter and receiver so as to be feasible for high-speed satellite communication system and optical fiber network. Besides, comparing with the conventional satellite communication system, the electric power (solar energy) on the satellite has to be sustained in order to provide a working power for microwave transponder. However, according to the present invention, only a reflective mirror and a vibration circuit is needed to be mounted on the satellite. There is no need to consume large electrical power for working. Moreover, the optical communication system is free from the electromagnetic interference coming from the sunspots, and multiple light beams can be reflected on a single mirror so that it can be applied for the purpose of multiple access.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

We claim:

1. An optical communication system comprising:

an optical transmitting device for emitting an optical signal carrying ail input data as a carrier signal;

a first reference optical signal generator for emitting a first reference optical signal, in which said first reference optical signal has a first beat frequency $f_1$, difference with the frequency of said carrier signal;

an optical receiving device receiving said carrier signal and said first reference optical signal through an optical transmission path for retrieving said input data; and a second reference optical signal generator for emitting a second reference optical signal to said optical receiving device;

wherein the frequency of said second reference optical signal can be adjusted according to said first beat frequency difference $f_1$, and a second frequency difference $f_3$, which is a frequency difference between said carrier signal frequency and said second reference optical signal frequency generated in said second reference optical signal generator.

2. The optical communication system of claim 1 wherein said optical transmitting device comprising:

an electrical signal modulating device for modulating said input data to an electrical signal;

a laser signal generator electrically connected with said electrical signal modulating device for transforming said electrical signal into a laser signal; and a 2×2 optical coupler optically connected with said electrical signal modulating device and said laser signal generator for receiving said laser signal and respectively transmitting said laser signal through a third optical path and a fourth optical path.

3. The optical communication system of claim 2 wherein said first reference optical signal generator comprising:

an automatic frequency controller (AFC) optically connected with said 2×2 optical coupler through said fourth optical path for generating a voltage signal according to the frequency drift of said laser signal, in which said voltage signal has an intensity variation following the frequency drift of said laser signal; and a first local oscillating laser signal generator electrically connected with said automatic frequency controller and optically connected with said 2×2 optical coupler through a second optical path for generating a first reference laser signal and transmitting said first reference laser signal to said 2×2 optical coupler through said second optical path, wherein said first reference laser signal frequency is varied with the intensity of said voltage signal generated by said automatic frequency controller so that said first reference laser signal has said first beat frequency difference with said laser signal.

4. The optical communication system of claim 1 wherein said optical receiving device comprising:

a 2×1 optical coupler optically connected with said optical transmission path and said second reference optical signal generator for receiving said carried signal and said first reference optical signal through said optical transmission path, and receiving said second reference optical signal through a sixth optical path;

a photodetector optically connected with said 2×1 optical coupler through a seventh optical path for transforming said carrier signal and said first reference optical signal into an electrical signal; and an electrical signal demodulating device electrically connected with said photodetector for retrieving said input data and a third electrical signal having a third frequency difference for output.

5. The optical communication system of claim 4 wherein said second reference optical signal generator comprising:

a filtering device electrically connected with said photodetector for retrieving a first electrical signal having a first frequency difference;

a mixer electrically connected with said filtering device and said electrical signal demodulating device for mixing said first electrical signal and said third electrical signal to generate a reference signal having a frequency of the difference between said first beat frequency difference and said third frequency difference;

a frequency discriminating device electrically connected with said mixer for generating a voltage signal having a frequency proportional to said difference between said first beat frequency difference and said third frequency difference according to said frequency difference between said first frequency difference and said third frequency difference; and a second local oscillating laser signal generator electrically connected with said frequency discriminating device and optically connected with said 2×1 optical coupler through the sixth optical path for generating a second reference laser signal and transmitting said second reference laser signal to said 2×1 optical coupler through said sixth optical path, wherein said second reference laser signal frequency can be adjusted according to the frequency drift of said carrier signal.

6. The optical communication system of claim 1 wherein said optical transmission path including:

a first telescope optically connected with said 2×2 optical coupler through said third optical path for emitting said carrier signal and said first reference optical signal;

a reflective mirror mounted on a satellite for reflecting said carrier signal and said first reference optical signal; and a second telescope optically connected with said 2×1 optical coupler through a fifth optical path for receiving said carrier signal and said first reference optical signal reflected from said reflective mirror.

7. The optical communication system of claim 1 wherein said optical transmission path is constructed with optical fiber.

8. The optical communication system of claim 5 wherein said electrical signal modulating device and said electrical signal demodulating device performs the modulation/demodulation operation by using frequency-shift keying (FSK) modulation/demodulation method.

9. The optical communication system of claim 5 further comprising an optical polarization controller optically connected between said first local oscillating laser signal generator and said 2×2 optical coupler through said second optical path.

10. The optical communication system of claim 5 further comprising an optical polarization controller optically connected between said second local oscillating laser signal generator and said 2×1 optical coupler through said sixth optical path.

11. A method for communication with an optical signal, comprising the steps of:

emitting a carrier signal carrying an input data;

emitting a first reference optical signal, in which said first reference optical signal has a first beat frequency difference $f_1$ with said carrier signal;

receiving said carrier signal and said first reference optical signal from an optical transmission path; and processing said carrier signal and said first reference optical signal with a second reference optical signal generated by a second reference optical signal generator;

wherein the frequency of said second reference optical signal can be adjusted according to said first beat frequency difference $f_1$, and a second frequency difference $f_3$, which is a frequency difference between said carrier signal frequency and said second reference optical signal frequency so as to eliminate the frequency drifting effect of said carrier signal frequency.

12. The method of claim 11 wherein said optical transmission path is constructed with optical fiber.

* * * * *